United States Patent [19]

Yamamoto

[11] 4,139,954
[45] Feb. 20, 1979

[54] PRE-RECORDED MAGNETIC AUDIO TAPE FOR LEARNING

[76] Inventor: Takeshi Yamamoto, Fujinodai-Danchi 1-20-106, Honmachida 3486, Machida-shi, Tokyo, Japan

[21] Appl. No.: 800,085

[22] Filed: May 24, 1977

[30] Foreign Application Priority Data

Dec. 3, 1976 [JP] Japan .......................... 51/161245[U]
Feb. 7, 1977 [JP] Japan ............................ 52/12534[U]

[51] Int. Cl.² ........................ G09B 7/02; G09B 19/06; G11B 23/16
[52] U.S. Cl. .................................... 35/8 A; 35/35 C; 360/18
[58] Field of Search ................ 35/8 A, 35 C; 360/18, 360/134, 137

[56] References Cited

U.S. PATENT DOCUMENTS

| 2,876,561 | 3/1959 | Horne | 35/35 C |
| 2,892,040 | 6/1959 | Johnson et al. | 35/35 C X |
| 3,118,235 | 1/1964 | Ley | 35/35 C |

Primary Examiner—William H. Grieb
Attorney, Agent, or Firm—Wenderoth, Lind & Ponack

[57] ABSTRACT

A magnetic audio tape comprises at least two tracks in one direction of advance of the tape. Each of the tracks has pre-recorded sections at sufficient intervals therebetween, with the recorded sections of one of the tracks being staggered with respect to the recorded sections of the other track in such a manner that all of the recorded sections of the tracks are not opposite to each other in the transverse direction of the tape. Each of the recorded sounds in the recorded sections of one track is closely related as a learning aid to the recorded sound of the staggered adjacent recorded section of the other track.

6 Claims, 4 Drawing Figures

PRE-RECORDED MAGNETIC AUDIO TAPE FOR LEARNING

BACKGROUND OF THE INVENTION

This invention relates to a pre-recorded magnetic audio tape especially suited for learning such as foreign languages and, more particularly, to a pre-recorded magnetic audio tape comprising at least two tracks in one direction of advance of the tape and adapted to be used with a tape recorder which can reproduce the recorded sounds in one track and the other track selectively or simultaneously.

Heretofore, many magnetic audio tapes of this kind have been provided. One such tape used for language laboratory and known as an LL tape is most typical and commercially available.

SUMMARY OF THE INVENTION

A primary object of the present invention is to provide a pre-recorded magnetic audio tape especially suited for use as a learning aid.

Another object of the present invention is to provide a pre-recorded magnetic audio tape adapted for use with a tape recorder which can reproduce recorded sounds in plural tracks selectively or simultaneously.

Still another object of the present invention is to provide a pre-recorded magnetic audio tape of the type set forth above wherein a user or a student can effectively learn the preparation of answers by listening only to recorded sounds of the corresponding questions.

A further object of the present invention is to provide a pre-recorded magnetic audio tape of the type set forth above wherein the student can not only learn the preparation of answers by listening only to the recorded sounds of the corresponding questions, but can also listen to the pre-recorded sounds of the answers if so desired.

Another object of the present invention is to provide a pre-recorded magnetic audio tape of the type set forth above wherein even if the recorded sound in one track is magnetically induced to the other adjoining track, the magnetically induced sound becomes indistinguishable even when the other track is reproduced at a high volume level at a quiet place.

According to the present invention, a magnetic audio tape comprises at least two tracks in one direction of advance thereof, each of the tracks having pre-recorded sections at sufficient intervals therebetween in the direction of advance of the tape. The recorded sections of one of the tracks are staggered with respect to the recorded sections of the other track in such a manner that all of the recorded sections of the tracks are not opposite each other in the transverse direction of the tape. Each of the recorded sounds in the recorded sections of one track is closely related to a recorded sound of the staggered adjacent recorded section of the other track.

Preferably, intermediate sections between the prerecorded sections of each of the tracks are also recorded with small sounds. The level of volume of the small sounds is much lower than that of the sounds in the pre-recorded sections on the same track but high enough to render indistinguishable a low volume of sounds magnetically induced on the track from the other adjoining track.

Other objects and features of the present invention shall be described hereinafter in detail with reference to the attached drawings, in which:

BRIEF DESCRIPTION OF THE DRAWINGS

FIG. 3 is a schematic view showing a magnetic audio tape pre-recorded in accordance with the present invention and adapted for learning or training English conversation and word training; and FIG. 4 is a schematic view showing a magnetic audio tape according to another embodiment of the present invention adapted for the same learning aid as the embodiment of FIG. 3.

DETAILED DESCRIPTION OF THE INVENTION

In order to make the present invention more clear, reference will first be made to a known magnetic audio tape for language laboratory (hereinafter referred to as an LL tape) shown in FIGS. 1 and 2.

Figure 1:
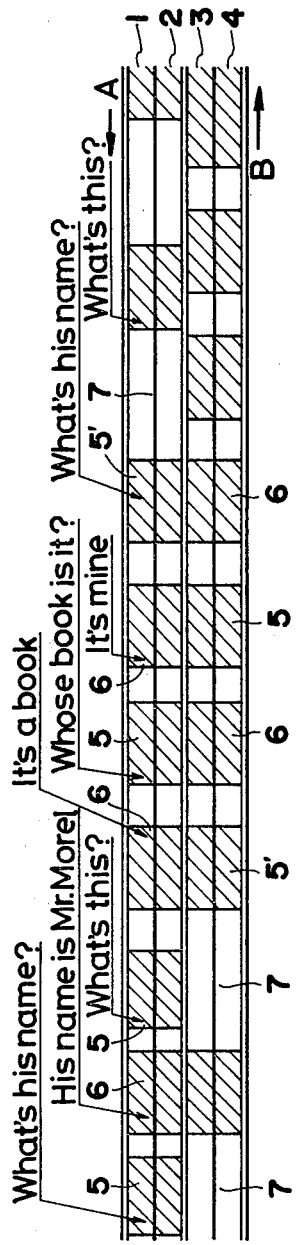
FIG. 1 is a schematic view showing a pre-recorded pattern of a known LL tape.
Figure 2:
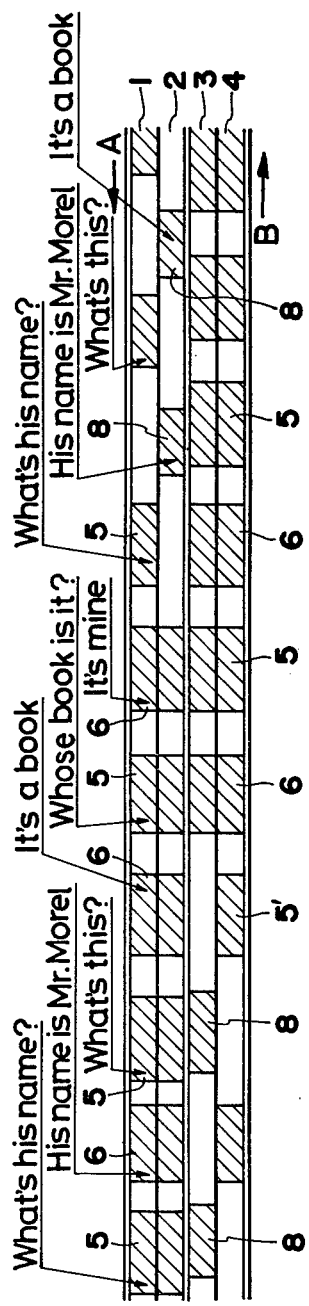
FIG. 2 is a schematic view showing a pattern partially recorded by a user or student using the LL tape shown in FIG. 1.

As shown in FIG. 1, a LL tape generally used for learning languages has four tracks in total, of which two tracks 1 and 2 are provided in one direction of advance shown by an arrow "A" while the other two tracks 3 and 4 are provided in the other direction of advance shown by an arrow "B". Referring to the pre-recorded pattern of the first and second tracks 1 and 2, respectively, in the direction of advance shown by arrow "A", a series of exemplary dialogue comprising questions 5 and answers 6 are pre-recorded by instructors on the adjoining two tracks 1 and 2 with the recorded sound of each question or answer on the adjoining two tracks being integral with each other. Following the series of recordings of the instructor's exemplary dialogue, another instructor's question 5' is pre-recorded in the adjoining two tracks 1 and 2, which is followed by an unrecorded section 7 of a comparatively long interval for the expected corresponding answer of a user. Likewise, other instructor's questions 5' are intermittently pre-recorded with comparatively long intervals therebetween.

Such a magnetic audio tape for learning a language is used together with a tape recorder for a language laboratory or a stereophonic tape recorder, which can selectively reproduce the recorded sounds in any one of the tracks or both tracks by a simple adjustment of a dial thereon. When the user or student teaches himself while using this tape on such a tape recorder, he first reproduces and listens to the recorded sounds of the instructor's exemplary dialogue comprising exemplary questions 5 and answers 6. Then, after listening to the instructor's question 5', he pronounces his own answer while the head of the tape recorder traces the unrecorded section 7 of the tape. At this time when the student reproduces the instructor's exemplary dialogue and questions 5', the dial on the tape recorder for changing the two tracks 1 and 2 may be at any desired reproducing position since the instructor's dialogue and questions are recorded on both tracks 1 and 2. If it is desired for the student to record his own answer into the tape in response to the instructor's question 5', the dial on the tape recorder is set to select one of the tracks, for example, second track 2 in this embodiment. Thus, the student's pronounced answers 8 are recorded on the unrecorded sections in the second track of the tape as shown in FIG. 2. Such recording of the student's pronounced answer can be made after listening to the instructor's question 5′, but a part of the recording of the instructor's question 5′ which is on the second track 2 is erased. However, other part of the recording of the instructor's questions 5′ remains on the first track 1. The same recordings can be adapted to the tracks 3 and 4 in the other direction of advance of the tape indicated by the arrow "B".

In such a known LL tape, the instructor's exemplary dialogue comprising the exemplary questions 5 and answers 6 is pre-recorded for most of the entire length of the tape and each question 5 or answer 6 of the dialogue is recorded on both adjoining tracks, so that the student cannot selectively listen only to the qeustions 5 or answers 6 for most parts of the tape. To listen only to the answers, or to listen to the questions and the corresponding answers successively in turn at tape sections following the instructor's question 5′, the student has to record his own pronounced answers on the unrecorded sections 7 of the tape. However, such tape sections 7 account for only a small part of the entire length of the tape. In addition, it is not easy for the student to record his own answers timely, nor is it easy for children and women to manipulate the recording operation of the tape recorder. Moreover, in case the student records his own answers 8 on the unrecorded sections 7 of the tape, he has to listen to his own poorly pronounced answers while learning to prepare the corresponding exemplary questions to the answer.

Another serious problem has been experienced when the student records his own answers 8 by using a widely used portable tape recorder of the type set forth above and known as LL tape recorder. That is, when the student records his own answers 8 on the unrecorded answer sections 7 of one of the two tracks, e.g., the second track 2 of the tape, electromagnetic induction is caused on the first adjoining track due to the tracing by the magnetic head, and this results in a corresponding recording on the first track as well, although the latter recording takes place at a low level of volume such as about one-thirtieth of the normal recording volume on the second track. Accordingly, when it is intended to reproduce only the recorded sound on the first track at a relatively high volume in a quiet place, the sound recorded by the electromagnetic induction on the first track becomes audible to the student, with the result that learning to prepare answers after listening to the corresponding questions by reproducing the sounds on the first track becomes difficult.

Figures 3, 4:
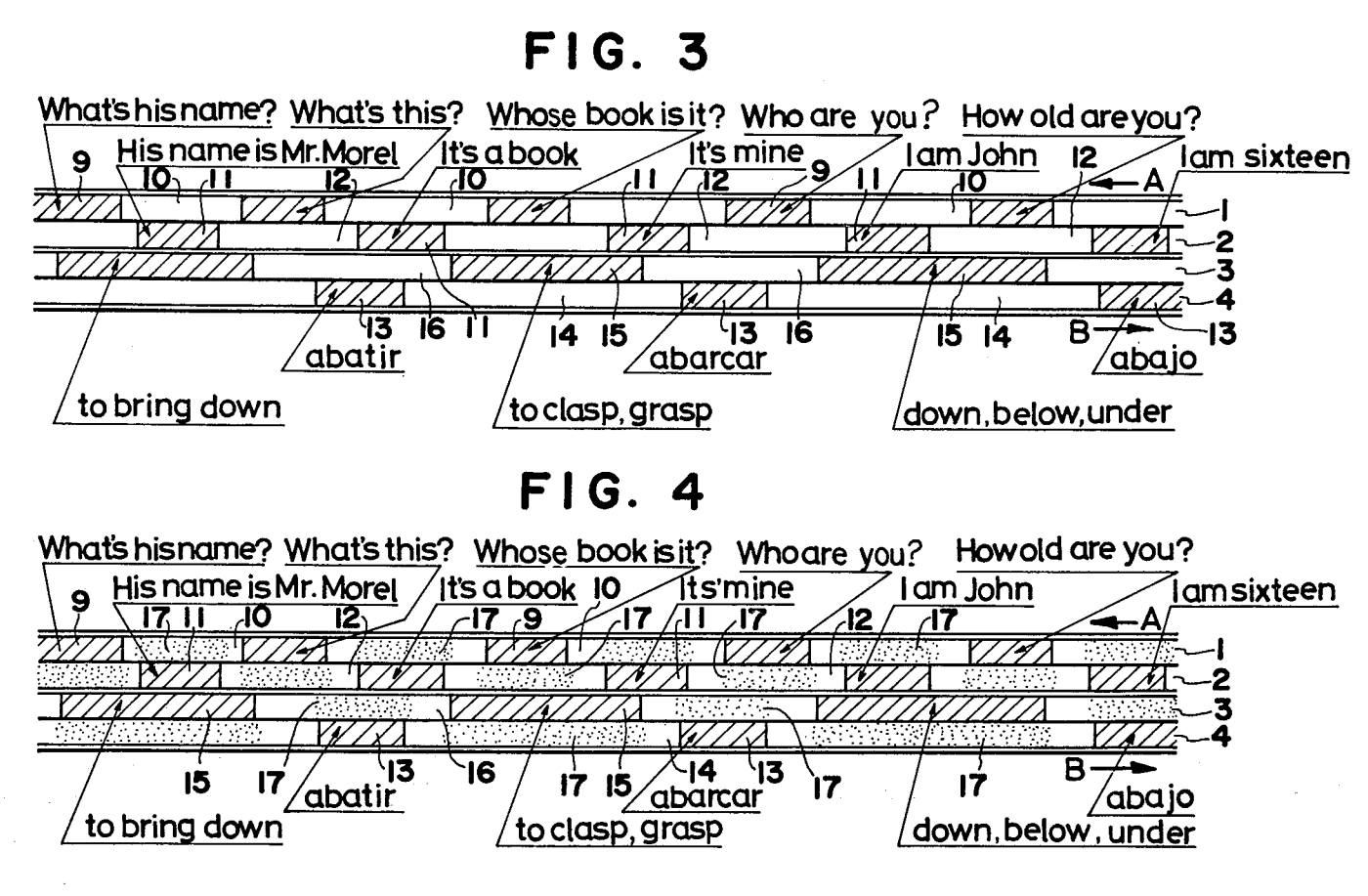

Referring to a first embodiment of the present magnetic audio tape shown in FIG. 3, the tape comprises a total of four tracks with first track 1 and second track 2 extending in one direction of advance of the tape as shown by an arrow "A", and third track 3 and fourth track 4 extending in the other direction of advance of the tape as shown by an arrow "B". The first and second tracks 1 and 2 are adapted for the training of English conversation or dialogue, while the third and fourth tracks 3 and 4 are adapted for word training from Spanish to English or vice versa. Referring now to the first and second tracks 1 and 2 of the tape, the first track 1 is pre-recorded with sounds of English interrogative sentences or questions 9, as shown in FIG. 3, at intervals with intermediate unrecorded sections 10 therebetween. Each unrecorded section 10 following a question 9 has a sufficient length to allow a user or student of this tape to pronounce his answer after listening to the sound of the preceding question 9. The second track 2 adjoining the first track is pre-recorded with sounds of English answers 11 at intervals with intermediate unrecorded sections 12 therebetween. These recorded sections of the answers 11 in the second track 2 are staggered with respect to the recorded sections of the questions 9 in the first track 1 in the direction of advance of the tape such that all of the recorded sections 9 and 11 in the first and second tracks 1 and 2, respectively, are not opposite to each other in the transverse direction of the tape. That is, the recorded sections of the questions 9 in the first track are opposite to the adjoining unrecorded sections 12 in the second track 2, while the recorded sections of the answers 11 in the second track 2 are opposite to the adjoining unrecorded sections 10 of the first track 1.

It should be noted here that the recorded sounds in the staggered recorded sections in the first and second tracks are closely related with each other as learning aids and that, in the embodiment of learning English dialogue shown in FIG. 3, the recorded sounds of the answers 11 in the second track each correspond to the preceding question 9 in the first track 1. Also, it should be noted that all of the staggered recording sections 9 and 11 in the first and second tracks are pre-recorded by an instructor or instructors and that no tape section is intended to be used for recording by a user or student himself in the present tape. It is preferable in the present tape that the staggered recording pattern takes place along the entire length of the tape.

Although it has been described in the embodiment shown in FIG. 3 that the sounds of the questions 9 are recorded in the first track 1 and that the sounds of the answers 11 are recorded in the second track 2, they may be recorded vice versa, i.e. the sounds of the questions being recorded in the second track 2 with the sounds of the answers being recorded in the first track.

In the embodiment shown in FIG. 3, the other two tracks, i.e. third and fourth tracks 3 and 4 extending in the other direction of advance of the tape as shown by the arrow "B", are adapted for word training from Spanish to English. That is, the fourth track 4 is pre-recorded with sounds of Spanish words 13 at intervals with unrecorded sections 14 therebetween, while the third track 3 is pre-recorded with sounds of English terms 15 for the meanings of the corresponding Spanish words 13 at intervals with unrecorded sections 16 therebetween. As in the case of the first and second tracks in FIG. 3, the recorded sections 13 and 15 in the fourth and third tracks 4 and 3, respectively, are staggered with respect to each other in such a manner that the recorded sections of one track are opposite to the unrecorded sections of the other track. Thus, except for the contents of the recordings, the other recording pattern in the third and fourth tracks is substantially the same as the pattern of the first and second tracks.

The magnetic audio tape thus pre-recorded as shown in FIG. 3 is used together with a tape recorder which can reproduce the recorded sounds in one or the other of the tracks selectively or both tracks simultaneously. One such tape recorder widely used is a portable tape recorder for language laboratory (referred hereinafter as "LL tape recorder") which can steplessly change the selection of the two tracks from one to the other by rotating a dial thereon. Usually, the dial takes two extreme positions, one extreme position selecting the first track to reproduce the sounds thereon and the other extreme position selecting the second track to reproduce the sounds thereon with an intermediate position therebetween to reproduce the sounds of both the first and second tracks. The application of the present tape shall be described hereinafter with regard to the use of the LL tape recorder.

To learn English conversation or dialogue recorded in the first and second tracks 1 and 2 of the present tape shown in FIG. 3, the dial of the LL tape recorder is set to the intermediate position. At this position of the dial, the magnetic head of the LL tape recorder traces the center part of both tracks 1 and 2, so that the recorded sounds of the questions 9 and the corresponding answers 11 are successively reproduced in turn as if these sounds were recorded in the same track. Thus, the user or student can learn English conversation or dialogue as in the case of the normal known magnetic tape shown in FIG. 1. Then, when the dial is set to the one extreme position which selects the first track, only the sounds of the English questions 9 are reproduced with intervals therebetween, so that the student can prepare the corresponding answers while the magnetic head traces the unrecorded sections 10 of the first track. Alternatively, when the dial of the LL tape recorder is set to the other extreme position which selects the second track, only the sounds of the English answers 11 are reproduced with intervals therebetween, so that the student can prepare the corresponding questions for the reproduced answers while the magnetic head traces the unrecorded sections 12 of the second track 2.

Thus, by using the present tape with an LL tape recorder, the student can learn English conversation or dialogue in three ways, whereby the effect of the learning is much more enhanced. In case the first and second tracks are pre-recorded along the entire length thereof with questions and answers in the staggered relation as shown in FIG. 3, the student can join into the conversation from the beginning of the tape, as though a party to the conversation, by reproducing only the questions on one track.

To study the words recorded on the third and fourth tracks 3 and 4, the magnetic tape is set on the LL tape recorder so that the tape can advance in the direction of arrow "B". Thereafter, the dial on the tape recorder is operated in the same way as set forth regarding the study of the English conversation. That is, by setting the dial to the intermediate position, the recorded sounds of the Spanish words 13 and the English meanings 15 of the Spanish words 13 are successively reproduced in turn. Also, the dial can be set to reproduce only the recorded sounds in the third track 3 or the fourth track 4, so that the student may practice the preparation of English meanings 15 by listening only to the Spanish words 13, or the preparation Spanish words 13 by listening only to the English meanings 15.

It has been experienced in some of the known portable LL tape recorders that when the magnetic head thereof traces the unrecorded sections of one track, the sounds recorded in the adjoining recording sections of the other track are reproduced by magnetic induction. Though the sound level reproduced by electromagnetic induction is quite small, such sounds are distinguishably audible to the user when the recorded sounds on one track are reproduced at a high volume position of the tape recorder in a quiet place. Such reproduction of the sounds caused by electromagnetic induction are not desirable for the effective study of the present tape, since if the student wants to practice to prepare answers by listening only to the questions recorded in one track, the answers in the adjoining track may be audible to him.

To improve the above disadvantages, according to the embodiment of the present invention shown in FIG. 4, the intermediate tape sections 10, 12, 14 and 16 between the recorded sections 9, 11, 13 and 15, respectively, have recorded thereon small or low-level background 17. The level of volume of the small sounds 17 is much lower than that of the sounds in the recorded section 9, 11, 13 and 15, but high enough to render indistinguishable a low volume of sounds from the adjoining other track. Usually, the volume of sounds magnetically induced on one track from the other adjoining track is about one-thirtieth of the normal volume of recording sounds having a magnetic flux density of about 250p wb/m$^2$. Preferably, the volume of small sounds 17 to be recorded on those portions 10, 12, 14 and 16 of the tracks is made equal to or up to twice that of the sounds which may be produced by electromagnetic induction.

Preferably, the small sounds to be recorded are sounds such as background music. These small sounds may be recorded first along the entire length of all of the tracks. Thereafter, a sufficient volume of the sounds for the learning aid are recorded in these tracks with the staggered pattern as described and shown in FIGS. 3 and 4, with the result that the previously recorded small sounds are erased by the subsequently recorded sections 9, 11, 13 and 15 and remain only at the intermediate sections therebetween.

Thus, in the preferred embodiment shown in FIG. 4, the sounds reproduced in one track from the other adjoining track by electromagnetic induction are mixed with the pre-recorded small sounds on the one track and become indistinguishable even when the sounds of the learning aid are reproduced at a high volume in a quiet place.

Although the present invention has been described with reference to preferred embodiments thereof, many modifications and alterations may be made within the spirit of the present invention. Especially, the present tape can be adapted to many learning aids other than the learning of conversation in English or other foreign languages and word trainings.

What is claimed is:

1. A magnetic audio tape employable as a learning aid, said tape comprising:
    at least first and second adjacent tracks extending longitudinally in a direction of advancement of the tape;
    both of said first and second tracks including separate longitudinally spaced pre-recorded sections separated by intermediate sections;
    said pre-recorded sections of said first and second tracks being staggered with respect to each other in said direction of advancement, such that all of said pre-recorded sections of said first track are entirely out of alignment with all of said pre-recorded sections of said second track, taken transversely of said direction of advancement, and such that all of said pre-recorded sections of each of said tracks are entirely transversely aligned with portions of said intermediate sections of the other of said tracks;
    said pre-recorded sections having thereon recorded sounds, each said recorded sound of said first track being related as a learning aid to the next succeeding said recorded sound of said second track, taken in said direction of advancement, whereby upon reproduction of one of said tracks there may occur on said intermediate sections thereof low volume magnetically induced recorded sounds from the respective pre-recorded sections of the other of said tracks; and means for rendering audibly indistinguishable said low volume magnetically induced recorded sounds, said means comprising background sounds recorded along the entire length of all of said intermediate sections of both of said tracks, said background sounds having a volume level substantially lower than that of said recorded sounds but high enough to render audibly indistinguishable said low level magnetically induced recorded sounds.

2. A magnetic audio tape as claimed in claim 1, wherein said recorded sounds of said first track comprise questions, and said recorded sounds of said second track comprise answers corresponding to said questions.

3. A magnetic audio tape as claimed in claim 2, wherein said questions and answers comprise dialogue for a conversation.

4. A magnetic audio tape as claimed in claim 2, wherein said questions comprise pronounced foreign words and said answers comprise pronounced mother tongue words corresponding to said foreign words.

5. A magnetic audio tape as claimed in claim 1, wherein said volume level of said background sounds is from one to two times the volume level of said low level magnetically induced recorded sounds.

6. A magnetic audio tape as claimed in claim 1, wherein said background sounds comprise background music.

* * * * *